United States Patent [19]

Armiger et al.

[11] Patent Number: 4,759,985
[45] Date of Patent: Jul. 26, 1988

[54] COMPOSITES OF STRETCH BROKEN ALIGNED FIBERS OF CARBON AND GLASS REINFORCED RESIN

[75] Inventors: Thomas E. Armiger, Newark; David H. Edison, Hockessin; Herbert G. Lauterbach, Wilmington, all of Del.; James R. Layton, Kinston, N.C.; Richard K. Okine, Wilmington, Del.

[73] Assignee: E. I. Du Pont de Nemours and Company, Wilmington, Del.

[21] Appl. No.: 942,441

[22] Filed: Dec. 16, 1986

[51] Int. Cl.[4] .............................................. D02G 3/00
[52] U.S. Cl. .................................. 428/367; 428/361; 428/375; 428/408; 57/2
[58] Field of Search .............. 428/361, 367, 375, 408; 57/2; 28/245

[56] References Cited

U.S. PATENT DOCUMENTS

| | | | |
|---|---|---|---|
| 2,948,103 | 8/1960 | Nai | 57/2 |
| 2,961,821 | 11/1960 | Marzocchi et al. | 57/2 |
| 4,107,128 | 8/1978 | Hosoi et al. | 428/367 X |
| 4,369,622 | 1/1983 | Teed et al. | 57/2 |
| 4,477,526 | 10/1984 | Lauterbach | 428/399 |
| 4,552,805 | 11/1985 | Fish, Jr. et al. | 428/297 |
| 4,555,446 | 11/1985 | Sumida et al. | 428/367 |
| 4,698,956 | 10/1987 | Clarke et al. | 57/2 |

FOREIGN PATENT DOCUMENTS 249291 10/1971 United Kingdom.
1389539 4/1975 United Kingdom.

OTHER PUBLICATIONS

Aligned short glass fibre/epoxy composites, L. Kacir, M. Narkis and O. Ishai; Composites, Apr., 1978.
Oriented Short Glass Fiber Composites, L. Kacir, M. Narkis and O. Ishai; Polymer Engineering and Science, Apr., 1977, vol. 17, No. 4.
Oriented Short Glass-Fiber Composites, L. Kacir, M. Narkis and O. Ishai; Polymer Engineering and Science, Jul., 1975, vol. 15, No. 7.
Structural SMC—Material, Process and Performance Review, Society of Automotive Engineers, Inc., Technical Paper Series Nos. 780355, Mar., 1978 and 5-T-m-8364, Oct., 1978.
Product Licensing Index, Apr., 1971, p. 47.

Primary Examiner—Lorraine T. Kendell

[57] ABSTRACT

A coating of a viscous lubricant applied prior to stretch-breaking permits forming slivers of stretch-broken carbon fibers. When an anti-static ingredient is added to the viscous lubricant cohesive slivers of stretch-broken glass fibers can be formed. Composites of matrix resin reinforced with these slivers exhibit high strength, tensile stiffness, and good formability.

3 Claims, 2 Drawing Sheets

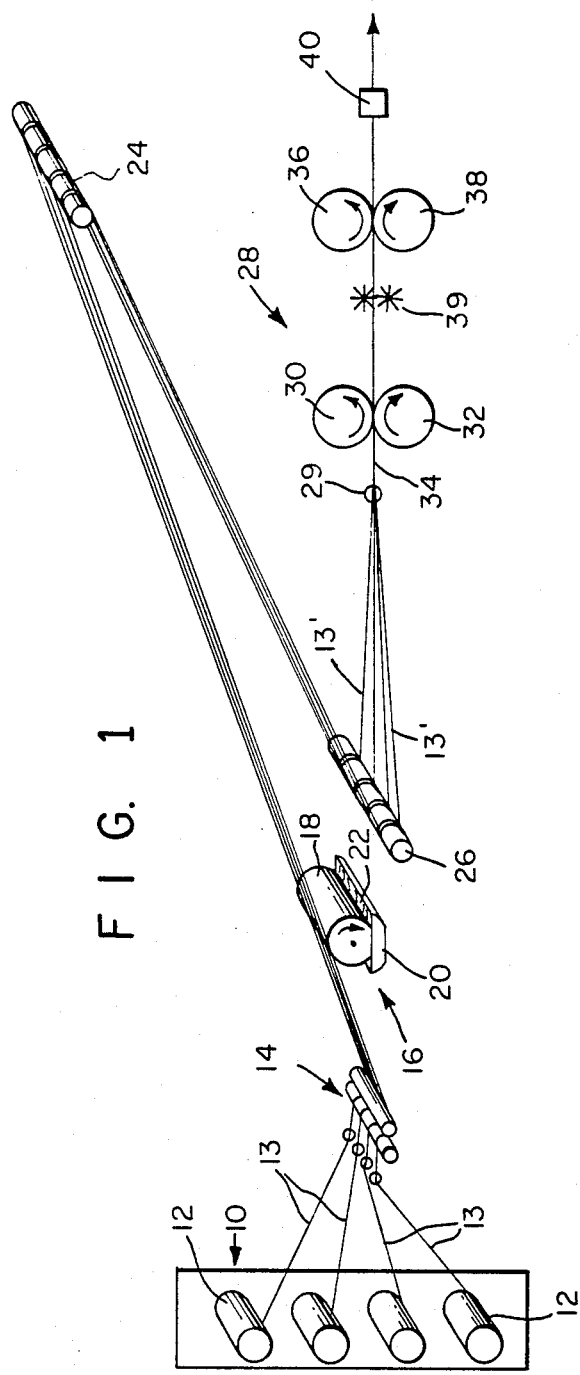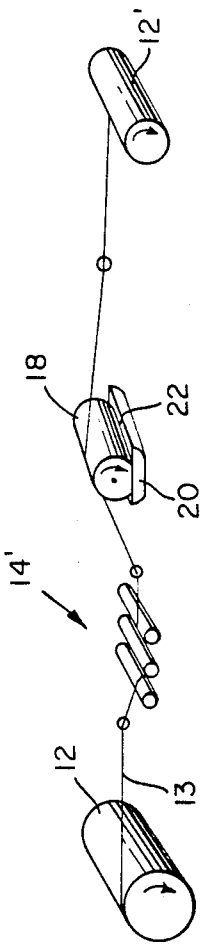

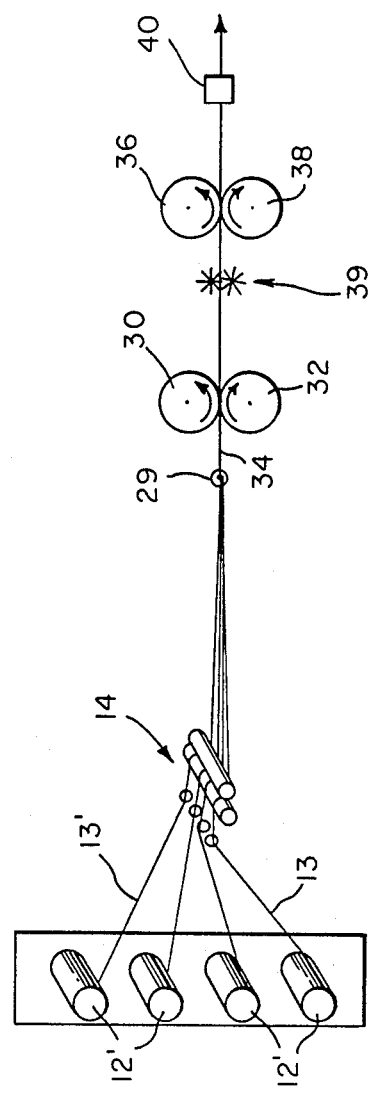

4,759,985

COMPOSITES OF STRETCH BROKEN ALIGNED FIBERS OF CARBON AND GLASS REINFORCED RESIN

BACKGROUND OF THE INVENTION

This invention relates to a process for stretch breaking carbon and glass filaments and using the stretch broken slivers therefrom to form a composite of either a matrix reinforced with carbon fibers or a matrix reinforced with glass fibers.

Composite sheets of either continuous filament carbon fiber reinforced resin or continuous filament glass fiber reinforced resin have been made. One technique is to prepare a warp of filaments as by winding on a frame, impregnating them with resins and hot pressing to form a thin flat sheet which is cut from the frame. Several such sheets are then cross lapped and again hot pressed to form the final reinforced composite product. Such products have high strength and stiffness.

Problems occur when attempts are made to produce deep drawn three dimensional articles by hot pressing continuous carbon or glass filament containing resin sheets. The articles in many instances exhibit uneven areas and wrinkles. The use of staple carbon or glass fibers as reinforcement substantially overcomes the above-stated problems but at a great sacrifice to strength and stiffness.

In a similar situation involving P-aramid fibers, a solution to the aforementioned problem was the use of certain stretch broken P-aramid fibers as disclosed by Fish and Lauterbach in U.S. Pat. No. 4,552,805. However, because carbon and glass filaments exhibit little or no cohesive capability when processed according to known stretch-breaking processes, slivers of carbon or glass fibers have not been able to be formed by these known processes.

The present invention permits forming cohesive slivers of stretch broken filaments of carbon and glass for use in forming a composite carbon or glass fiber reinforced resin useful for deep drawing purposes with little sacrifice of strength and stiffness.

SUMMARY OF THE INVENTION

A cohesive sliver of stretch broken glass or carbon fibers having a high degree of axial alignment and a coating of a finish comprising a viscous lubricant and an anti-static ingredient. Composites of a matrix resin reinforced with such slivers and shaped structures formed therefrom are also encompassed.

BRIEF DESCRIPTION OF THE DRAWING

FIG. 1 is a schematic illustration of a preferred embodiment apparatus for use with a continuous process in the practice of the present invention.

FIG. 2 is a schematic illustration of apparatus for applying finish to a carbon or glass filament yarn.

FIG. 3 is a schematic illustration of apparatus for stretch-breaking a cohesive carbon or glass yarn.

DETAILED DESCRIPTION OF THE PREFERRED EMBODIMENT

Referring to FIG. 1, the preferred embodiment generally includes a creel 10 for yarn supply packages 12, a plurality of yarn tensioning bars generally designated 14, a finish applicator 16 comprised of a rotatable finish roll 18 emersed in a pan 20 filled with a liquid finish 22 a pair of grooved roller guides 24,26 are located between the finish applicator 16 and a Turbo Stapler 28 (manufactured by the Turbo Machine Co., Lansdale, Pa.). The Turbo-Stapler includes a pair of driven nip rolls 30,32 which firmly grip the tow band 34 that has been consolidated from the individual yarns in guide 29. The nip rolls 30,32 feed tow band 34 at a constant rate to a pair of front rolls 36,38 which also grip the tow band 34 and withdraw it from breaker bars 39 and feed it as a sliver to a condensing guide 40 from which the sliver is fed to a windup (not shown) for packaging.

In operation, glass or carbon yarn 13 from individual packages 12 is fed from creel 10 over finish roll 18 where it is coated with finish 22. The yarns are consolidated in guide 29, tensioned between rolls 30,32 and front rolls 36,38, then randomly broken by sharply deflecting them laterally by the breaker bars 39. The coating of finish on the yarn in the sliver is sufficient to enable the sliver to be pulled through guide 40 to the windup without disassociation of the fibers in the sliver.

While the continuous process illustrated in FIG. 1 is preferred, the application of finish to continuous filament carbon or glass fibers and the stretch-breaking of the coated filaments can be carried out in two steps; i.e., separate finish application and stretch-breaking processes, according to FIGS. 2 and 3 and as described subsequently in Example 1. More particularly, in FIG. 2, glass or carbon yarn 13 from package 12 is fed over yarn tensioning bars 14' over finish roll 18 where it is coated with finish 22 and wound onto a bobbin 12' and allowed to dry. The yarn from bobbins 12' is then stretch-broken by breaker bars 39 (FIG. 3) in the turbostapler as described above in connection with FIG. 1.

The finish used in this invention is a material that causes an interfilament viscous drag sufficiently high to permit the handling required to make a composite, such as winding and unwinding from a package. More particularly, the finish used for the carbon fiber application is a mixture of a one part of a suitable antistat and two parts of a non-tacky viscous lubricant of a consistency to impart to the chopped sliver adequate cohesiveness (minimum of 0.01 grams per denier) without tackiness or without compromising the fiber-matrix adhesion in the final composite. The antistat portion of the mixture could be reduced or even eliminated if the reinforcing fiber is electrically conductive (e.g., carbon fibers).

A suitable viscous lubricant is polyethylene glycol (400 mol. wt) monolaurate and a lauric amide while a suitable antistat is mixed mono and di-phosphate esters of C8–C12 fatty alcohols neutralized with diethanol amine.

Preferably, the percent finish on fiber is in the range of from about 0.3% to about 0.5%.

Formable planar and shaped non-planar composites are contemplated by the present invention. For the formable composites, that is, those composites that can be formed into shaped non-planar three-dimensional structures at elevated temperatures (where necessary), matrix resins of the thermoplastic variety or of the not fully cured thermoset type may be employed. In the latter case the thermosettable resin is cured after the composite has been shaped. Suitable thermoplastic resins include polyesters (including copolyesters), e.g., polyethylene terephthalate, Kodar ® PETG copolyester 6763 (Eastman Kodak); polyamides, e.g., nylon 6,6; polyolefins, e.g., polypropylene; also included are the high temperature resins such as an amorphous polyamide copolymer based upon bis(para-aminocyclohexyl)

methane, a semi-crystalline polyamide homopolymer also based on bis(para-aminocyclohexyl) methane, and polyetheretherketone. Thermosetting resins that are useful include phenolic resins, epoxy resins and vinyl ester resins.

The ratio of reinforcement to matrix can vary, but preferably is between 40% to 75% by volume. The average fiber lengths also may vary but preferably range from about ½ to about 6 inches in length with a random overlap distribution. About 85 percent of the fibers are aligned within ±10 degrees, preferably ±5 degrees of the axial direction.

The composite may be made by a variety of procedures. Thus, a stretch broken sliver may be wound on a frame covered with a film of thermoplastic resin to form a warp. The warp of stretch-broken sliver, however, can be made by any technique known to those skilled in the art, e.g., by creeling or beaming. A preform is obtained when another film of thermoplastic resin is placed over the warp to form a sandwich which is heated in a vacuum bag and then removed from the frame. Several of such preforms may be stacked while offset to provide multi-directionality and then the stack may be heated under pressure to form a composite structure.

Other techniques for applying matrix polymer include sprinkling of powdered resin on the sliver warp followed by heating to melt the resin, flowing liquid resin over the sliver warp, intermingling thermoplastic fiber with the sliver warp and then heating to melt the thermoplastic fiber thereby forming the matrix resin, calendering the warp between layers of matrix film, etc.

Test Procedures

Composite Tensile

The composite tensile tests followed the general procedure described in ASTM Test D 3039-76 entitled "Standard Test Method for Tensile Properties of Fiber--Resin Composites."

Short Beam Shear

The short beam shear tests followed the general procedure described in ASTM Method D 2344-76 entitled, "Standard Test Method for Apparent Interlaminar Shear Strength of Parallel Fiber Composites by Short Beam Method" with the following exception, the loading nose was 1/16 inch radius instead of ⅛ inch.

Sliver Cohesion

The yarn to be tested for sliver cohesion was placed in the clamps of an Instron tensile testing machine set to a gauge length of 17 inches, a crosshead speed of 10 inches per minute and a chart speed of 12 inches per minute. The crosshead was started to apply tension to the sample and the maximum force in grams indicated on the chart was recorded and divided by the sliver denier to give the sliver cohesion.

Finish on Yarn

Finish on yarn is determined in a method wherein weighed specimens are extracted gravimetrically with prescribed solvent(s) at room temperature, the solvent containing dissolved finish and any other materials which may wash off the specimens, is transferred to a preweighed container and evaporated. The extractable residue is weighed. Percentage extractables based on extractable-free specimen weight is calculated. Aerothane ® (1,1,1-trichloroethane) is used as the solvent for all finish materials except glycerine and methanol is used as the solvent for that material.

High Temperature Tensile Drawing

The sample to be tested was placed in the clamps of an Instron tensile testing machine set to a particular gauge length and a crosshead speed depending on the sample. A thermocouple was attached the surface of the sample midway between the clamps and an 8 inch long electrically heated cylindrical oven was placed around the sample leaving a one inch space between the bottom of the oven and the lower clamp. The open ends of the oven were plugged with insulation material to prevent convective heat loss and heating of the clamps. The oven was turned on and the sample heated to reduce its viscosity to permit drawing (temperature determined by the viscosity, time, temperature data of the matrix material. Samples made with thermosetting matrix resins must be tested in their uncured state.). The sample was held at this temperature for 15 minutes to insure thermal equilibrium. The crosshead was then started and allowed to run until the heated section of the sample was drawn 50%. The oven was removed and the sample inspected to determine whether it had broken.

Fiber Orientation

A photomicrograph of the surface of the composite (enlarged 240×) was prepared. The angle between each fiber axis and the axial direction of the composite was measured with a protractor on the photomicrograph and tabulated. The percentage of fibers with an angle within ±5 degrees of the axial direction was reported.

EXAMPLE 1

Four bobbins of 2000 denier continuous filament carbon fiber (3K AS-4 from Hercules Inc.) were prepared for stretch-breaking by applying a finish composed of two parts of a lubricant (polyethylene glycol monolaurate and a lauric amide) and one part of an antistat (mixed mono and diphosphate esters of C8-C12 fatty alcohols neutralized with diethanol amine). The finish was applied by running the continuous filament carbon fiber, one bobbin at a time, at 75 yards/minute over a finish roll which was wet with a 4% aqueous emulsion of the lubricant-antistat mixture (FIG. 2). The four bobbins were allowed to stand overnight to evaporate the water. Finish level after drying was 0.33%.

The four bobbins of carbon fiber were stretch-broken on a Turbo-stapler (Turbo Machine Co., Lansdale, PA) as shown in FIG. 3. The surface speed of the rolls (30,32) was 35.4 yards/minute and the surface speed of the front rolls (36,38) was 110 yards/minute. The tip speed of the breaker bars (39) was 71 yards/minute. The resulting sliver was 2422 denier and had a cohesion value of 0.18 grams/denier which was sufficient to allow winding without twist on a cylindrical paper tube using a Leesona type 959 winder. The average fiber length of fifty measurements of this sliver was 3.2 inches (shortest 0.7 inch, longest 5.6 inches).

A warp was prepared from this sliver by winding it from the paper tube, 25 ends to the inch on a 16 inch square metal plate. A 2.0 mil thick film of thermoplastic resin (an amorphous polyamide copolymer based on bis(para-aminocyclohexyl) methane) was placed on the frame before winding the sliver and another was added after winding was complete. The entire sandwich was vacuum bagged at 280° C. for 15 minutes after which time it was cut from the plate. This product, called a preform was now a well-impregnated, relatively stiff matrix/stretch-broken sliver sandwich, in which all the slivers were aligned in one direction.

Twelve of these preforms were stacked on top of one another with all the fibers in the same direction. This stack was heated in a mold at 305° C. at 500 pounds per square inch for 35 minutes to make a well-consolidated plate 93 mils thick and fiber volume fraction of 55%. Short beam shear tests conducted on 0.5 inch wide strips cut from this plate gave a value of 13,700 pounds per square inch. It was concluded that the presence of the finish did not adversely affect the adhesion of the fiber to the matrix polymer.

A second plate was made from ten of these preforms by stacking them so that the direction of the stretch-broken fibers were offset by 45 degrees in a clockwise direction in successive layers. The bottom plane of the fifth layer was considered a reflecting plane and the next five layers were stacked so that the warp directions of the stretch-broken sliver were mirror images of the top five layers with respect to that plane. This sandwich was molded as above to make a well consolidated plate with a fiber volume fraction of 55%. This plate was heated to 322° C. and molded into a hemisphere with a radius of 3 inches. The plate conformed very well to the shape of the mold and it was concluded that the product was deep drawable without wrinkles.

EXAMPLE 2

A sliver of stretch-broken glass fiber was prepared by the method in Example 1 except that 6700 denier continuous filament glass fiber was used (T-30 P353B from Owens-Corning Fiberglass) and the finish was applied by spraying a 10% aqueous emulsion on the fiber. The emulsion was pumped to the spray nozzle at 5 cc. per minute and the air pressure used was 3 psi. The yarn was pulled past the spray head at 55 yards per minute by a pair of nip rolls and wound on a cylindrical paper tube. After drying, the finish level was 0.35%. Stretch-broken sliver was prepared from two finish treated continuous filament bobbins and had a cohesion of 0.09 grams per denier which was adequate for winding as in Example 1. Further, the finish controlled static generation in the stretch-breaking process to an acceptable level. The average fiber length of fifty measurements of this silver was 3.4 inches (shortest 1.0 inch, longest 10.2 inches).

A unidirectional plate was made from this sliver and PETG film (Kodar® PETG copolyester 6763, Eastman Kodak) by the method of Example 1 except that the sliver spacing was 26 ends per inch, the film thickness was 3.0 mils and 8 layers of preform were used to 55% fiber volume fraction. Short beam shear tests on 0.5 inch wide strips cut from this plate gave a result of 5,400 pounds per square inch. It was concluded that the presence of the finish did not affect the adhesion of the fiber to the matrix polymer.

EXAMPLE 3

A sample of carbon fiber sliver was prepared using the stretch-breaking process of Example 1 except that finish was not pre-applied to the continuous fiber and two bobbins were used instead of four. The two ends of carbon fiber were contacted by a felt pad saturated with glycerine which was placed between the tension guide and the infeed roll. Glycerine level on the sliver was 0.5%. The average fiber length of fifty measurements of this sliver was 3.2 inches (shortest 0.6 inch, longest 7.9 inch). Cohesion was measured as a function of time vs. the sliver from Example 1 with the following results.

| | Cohesion, grams per denier | |
|---|---|---|
| Days | Glycerine | Example 1 |
| 1 | .58 | .15 |
| 9 | .79 | .24 |
| 16 | .02 | .25 |
| 22 | .02 | .25 |
| 30 | .02 | .21 |

EXAMPLE 4

Glycerine treated sliver from Example 3 was made into a warp, preforms and a unidirectional plate by the method of Example 1. The end count was 12 per inch, the film was 3.0 mil thick PETG (Kodar® PETG copolyester 6763 from Eastman Kodak) and 6 preforms were stacked to make the plate which was 40% fiber volume fraction. The plate was cut into 0.5 inch strips, provided with aluminum tabs and subjected to tensile tests at 8 inch guage length with the following results:

| Tensile strength, psi. | 127,400 |
|---|---|
| Modulus, psi. | 11,600,000 |

It was concluded that the product had very high strength and modulus. The uniformity of orientation of the fibers on the surface of this plate were measured from a photomicrograph and it was found that 85% of the fibers were within ±5 degrees of the axial direction.

EXAMPLE 5

Continuous filament 2000 denier carbon fiber was made into a warp, preforms and a unidirectional plate. The end count was 12 per inch, the film was 3.0 mil thick PETG (Kodar® PETG copolyester 6763 from Eastman Kodak) and 16 preforms were stacked to make the plate which was 40% fiber volume fraction. The plate was cut into 0.5 inch strips, provided with aluminum tabs and subjected to tensile tests at 8 inch guage length with the following results:

| Tensile strength, psi. | 139,800 |
|---|---|
| Modulus, psi. | 11,600,000 |

It was concluded that the product of Example 4 exhibited the strength and stiffness expected of continuous filament carbon fiber. The product of Example 4, although made of stretch-broken discontinuous staple fiber, came within 90% of the strength and stiffness of the continuous filament product. This excellent performance is believed due to the high degree of order of the stretch-broken fibers.

EXAMPLE 6

Stretch broken glass sliver was prepared by the method of Example 2 except that finish was not pre-applied to the continuous fiber. Instead, the fiber being supplied to the Turbo-stapler was sprayed periodically with Jif-Job antistatic spray (Schafco, Lancaster, Pa.). The roll and breaker bar speeds were one-half the values in Example 2. The average fiber length of fifty measurements of this sliver was 3.1 inches (shortest 1.0 inch, longest 5.8 inch). This sliver was made into a warp, preforms and a unidirectional plate by the method of Example 1. The end count was 21 per inch, the film was 3.0 mil thick PETG (Kodare ® PETG copolyester 6763 from Eastman Kodak) and 5 preforms were stacked to make the plate which was 40% fiber volume fraction. The plate was cut into 0.5 inch strips, provided with aluminum tabs and subjected to tensile tests at 8 inch guage length with the following results:

| | |
|---|---|
| Tensile strength, psi. | 67,200 |
| Modulus, psi. | 4,950,000 |

It was concluded that the product had very high strength and modulus.

EXAMPLE 7

Continuous filament 6700 denier glass fiber was made into a warp, preforms and a unidirectional plate. The end count was 13 per inch, the film was 3.0 mils thick PETG (Kodar ® PETG copolyester 6763 from Eastman Kodak) and 5 preforms were stacked to make the plate which was 40% fiber volume fraction. The plate was cut into 0.5 inch strips, provided with aluminum tabs and subjected to tensile tests at 8 inch guage length with the following results:

| | |
|---|---|
| Tensile strength, psi. | 67,900 |
| Modulus, psi. | 5,460,000 |

It was concluded that the product of Example 6 exhibited the strength and stiffness expected of continuous filament glass fiber. The product of Example 6, although made of discontinuous staple fiber, came within 90% of the strength and stiffness of the continuous filament product.

EXAMPLE 8

A preform of stretch broken carbon fiber sliver in an epoxy resin (Hercules 3501-6) was made by the following procedure:

(1) The frozen resin was thawed at room temperature, then heated to 180° F. for 15 minutes.

(2) A film of resin was cast onto release paper then chilled to 40° F. to stop the polymerization reaction and the exposed surface was covered with polyester film for protection.

(3) The paper-resin-film sandwich was wound on a 7-foot diameter drum and the polyester film removed.

(4) 2300 denier graphite sliver made by the process of Example 1 was wound on the exposed resin at 9 ends per inch for a total width of 10.5 inches. The average fiber length of fifty measurements of this sliver was 3.2 inches (shortest 0.7 inch, longest 5.6 inches).

(5) The polyester film was removed from a second paper-resin-film sandwich and wound over the graphite layer on the drum to make a paper-resin-graphite-resin-paper sandwich.

(6) The sandwich was unwound from the drum and vacuum bagged flat at 140° F. for 10 minutes to force the resin into the graphite layer, then frozen for later use. The thickness of the resin-graphite part of this sandwich was 7 mils.

A unidirectional composite strip made by stacking together ten layers of ¾-inch wide and 14-inch long strips (fiber direction parallel to the 14-inch dimension) of the graphite-resin preform was vacuum bagged for two minutes. One inch on either end of the strip was partially cured by heating it to 120° C. for two hours while keeping the middle 12 inches of the strip cold with dry ice. At a guage length of 11 inches and a crosshead speed of 5 inches per minute, a high temperature tensile drawing test was conducted at 124° C. on the 14 inch long by 0.75 inch wide strip which showed the composite could be drawn 50% without breaking, predicting a high degree of formability.

A composite plate was made from 10 layers of the sandwich from step 6 above by removing the release paper, cutting the graphite-resin preform into sheets and stacking them so that the direction of the stretch-broken fibers were offset by 45 degrees in a clockwise direction in successive layers. The bottom plane of the fifth layer was considered a reflecting plane and the next five layers were stacked so that the warp directions of the stretch-broken sliver were mirror images of the top five layers with respect to that plane. This sandwich was vacuum-bagged at ambient temperature for 2 minutes to stick the layers together. This plate was molded into a hemisphere with a radius of 3 inches and cured in the mold at 175° C. for 2 hours. The plate conformed very well to the shape of the mold and it was concluded that the product was formable.

EXAMPLE 9

Four bobbins of 2000 denier continuous filament carbon fiber (3K AS-4 from Hercules Inc.) were stretch-broken on a Turbo-stapler (Turbo Machine Co., Lansdale, Pa.) set up as shown in FIG. 1. A 10% aqueous solution of the finish described in Example 1 was applied with a wetted roll. The surface speed of the intermediate rolls was 17.7 yards/minute and the surface speed of the front rolls was 55 yards/minute. The tip speed of the breaker bars was 35.5 yards/minute. The resulting sliver was 2250 denier. The average fiber length of fifty measurements of this sliver was 3.3 inches (shortest 0.8 inch, longest 5.5 inches).

A warp was prepared from this sliver by winding it, 27 ends to the inch on a 18 inch square metal plate. A 3.0 mil thick film of thermoplastic resin (PETG copolyester) was placed on the frame before winding the sliver and another was added after winding was complete. The entire sandwich was vacuum bagged at 220° C. for 15 minutes after which time it was cut from the frame. This product, called a preform was now a well-impregnated, relatively stiff matrix/stretch-broken silver sandwich in which all the slivers were aligned in one direction.

Seven of these preforms were stacked on top of one another with all the fibers in the same direction. This stack was heated in a mold at 200° C. at 400 pounds per square inch for 30 minutes to make a well-consolidated plate 82 mils thick and fiber volume fraction of 50%. High temperature tensile drawing tests at a guage length of 10 inches and crosshead speed of 10 inches per minute conducted at 262° C. on 12 inch long by 0.75 inch wide strips cut from this plate with the fiber direction parallel to the 12 inch dimension showed the composite could be drawn 50% without breaking, predicting a high degree of formability.

EXAMPLE 10

Two bobbins of 6700 denier continuous filament glass fiber (T-30 P353B from Owens-Corning Fiberglass) were stretch-broken on a Turbo-stapler (Turbo Machine Co., Lansdale, PA) set up as shown in FIG. 1. A 10% aqueous solution of the finish described in Example 1 was applied with a wetted roll. The surface speed of the intermediate rolls was 17.7 yards/minute and the surface speed of the front rolls was 55 yards/minute. The tip speed of the breaker bars was 35.5 yards/minute. The resulting sliver was 4100 denier. The average fiber length of fifty measurements of this sliver was 3.4 inches (shortest 0.9 inch, longest 8.7 inches).

A warp was prepared from this sliver by winding it, 22 ends to the inch on a 18 inch square metal plate. A 3.0 mil thick film of thermoplastic resin (PETG copolyester) was placed on the frame before winding the sliver and another was added after winding was complete. The entire sandwich was vacuum bagged at 220° C. for 15 minutes after which time it was cut from the frame. This product, called a preform was now a well-impregnated, relatively stiff matrix/stretch-broken sliver sandwich, in which all the slivers were aligned in one direction.

Seven of these preforms were stacked on top of one another with all the fibers in the same direction. This stack was heated in a mold at 200° C. at 400 pounds per square inch for 30 minutes to make a well-consolidated plate 82 mils thick and fiber volume fraction of 50%. High temperature tensile drawing tests at a guage length of 10 inches and crosshead speed of 10 inches per minute conducted at 262° C. on 12 inch long by 0.75 inch wide strips cut from this plate with the fiber direction parallel to the 12 inch dimension showed the composite could be drawn 50% without breaking, predicting a high degree of formability.

EXAMPLE 11

Sliver from Example 10 was re-broken to reduce the fiber length by passing it through two sets of elastomer coated nip rolls with a separation of 2.50 inches between the nips. The surface speed of the second set of rolls was 10 yards per minute and the surface speed of the first set of rolls was 7.1 yards per minute giving a draft of 1.4. Denier of this re-broken sliver was 5371 and the average fiber length of fifty measurements of this sliver was 1.57 inches (shortest 0.5 inch, longest 3.6 inches).

A 'warp' was prepared from this sliver by winding it, 17 ends to the inch on a 18 inch square metal plate. A 3.0 mil thick film of thermoplastic resin (PETG copolyester) was placed on the frame before winding the sliver and another was added after winding was complete. The entire sandwich was vacuum bagged at 220° C. for 15 minutes after which time it was cut from the frame. This product, called a preform was now a well-impregnated, relatively stiff matrix/stretch-broken sliver sandwich, in which all the slivers were aligned in one direction.

Seven of these preforms were stacked on top of one another with all the fibers in the same direction. This stack was heated in a mold at 200° C. at 400 pounds per square inch for 30 minutes to make a well-consolidated plate 80 mils thick and fiber volume fraction of 50%. High temperature tensile drawing tests at a guage length of 10 inches and crosshead speed of 10 inches per minute conducted at 262° C. on 12 inch long by 0.75 inch wide strips cut from this plate with the fiber direction parallel to the 12 inch dimension showed the composite could be drawn 50% without breaking, predicting a high degree of formability.

EXAMPLE 12

Sliver from Example 9 was re-broken to reduce the fiber length by passing it through two sets of elastomer coated nip rolls with a separation of 2.50 inches between the nips. The surface speed of the second set of rolls was 10 yards per minute and the surface speed of the first set of rolls was 7.1 yards per minute giving a draft of 1.4. Denier of this re-broken sliver was 4623 and the average fiber length of fifty measurements of this sliver was 1.33 inches (shortest 0.6 inch, longest 3.1 inches).

A warp was prepared from this sliver by winding it, 13 ends to the inch on an 18 inch square metal plate. A 3.0 mil thick film of thermoplastic resin (PETG copolyester) was placed on the frame before winding the sliver and another was added after winding was complete. The entire sandwich was vacuum bagged at 220° C. for 15 minutes after which time it was cut from the frame. This product, called a preform was now a well-impregnated, relatively stiff matrix/stretch-broken sliver sandwich, in which all the slivers were aligned in one direction.

Seven of these preforms were stacked on top of one another with all the fibers in the same direction. This stack was heated in a mold at 200° C. at 400 pounds per square inch for 30 minutes to make a well-consolidated plate 80 mils thick and fiber volume fraction of 50%. High temperature tensile drawing tests, at a guage length of 10 inches and a crosshead speed of 10 inches per minute, conducted, at 262° C., on 12 inch long by 0.75 inch wide strips cut from this plate with the fiber direction parallel to the 12 inch dimension showed the composite could be drawn 50% without breaking, predicting a high degree of formability.

EXAMPLE 13

A pre-laminate was prepared from glass fiber from Example 2 by a continuous process as follows: 46 ends of sliver were fed from a creel into a 6 inch wide warp which was sandwiched between two 1.0 mil PET poly-(ethylene terephthalate) films to give a pre-laminate of 55% fiber volume fraction. A release film of 'Kapton' polyimide was placed on each side of this sandwich to prevent sticking of molten PE to hot surfaces. This sandwich was then passed at 10 feet per minute through the nip of two steel rolls heated to 278° C. to tack the assembly together.

A composite plate was made from this pre-laminate by removing the release film, trimming the excess PET from the edges and placing strips of pre-laminate in layers in a 16 inch square mold. Each layer was made up of side-by side strips of pre-laminate to reach the required 16 inch width.

A plate was made from 10 layers of pre-laminate by arranging them so that the direction of the stretch-broken fibers were offset by 45 degrees in a clockwise direction in successive layers. The bottom plane of the fifth layer was considered a reflecting plane and the next five layers were stacked so that the warp directions of the stretch-broken sliver were mirror images of the top five layers with respect to that plane. This sandwich was molded as in Example 2 to make a well-consolidated composite plate with a fiber volume fraction of 55%. This plate was heated to 280° C. and molded into a hemisphere with a radius of 3 inches. The plate conformed very well to the shape of the mold and it was concluded that the product was formable.

EXAMPLE 14

A plate was made from 10 layers of pre-forms made by the method of Example 11 by arranging them in a 16 inch square mold so that the direction of the stretch-broken fibers were offset by 45 degrees in a clockwise direction in successive layers. The bottom plane of the fifth layer was considered a reflecting plane and the next five layers were stacked so that the warp directions of the stretch-broken sliver were mirror images of the top five layers with respect to that plane. This sandwich was molded as in Example 2 to make a well-consolidated composite plate with a fiber volume fraction of 55%. This plate was heated to 280° C. and molded into a hemisphere with a radius of 3 inches. The plate conformed very well to the shape of the mold and it was concluded that the product was formable.

EXAMPLE 15

Continuous filament 2000 denier carbon fiber was made into a warp, preforms and a unidirectional plate by the method of Example 1. The end count was 25 per inch, the film was 2.0 mil thick film of thermoplastic resin (an amorphous polyamide copolymer based on bis(para-aminocyclohexl) methane). Seven preforms were stacked to make the plate which was 55 mils thick and 55% fiber volume fraction. The plate was cut into 0.5 inch strips, provided with aluminum tabs and subjected to tensile tests at 8 inch gauge length with the following results:

| Tensile strength, psi. | 243,200 |
|---|---|
| Modulus, psi. | 18,200,000 |

It was concluded that the product had very high strength and modulus.

EXAMPLE 16

A warp was prepared from sliver from example 9 by winding it, 21 ends to the inch on a 18 inch square metal plate. A 2.0 mil thick film of thermoplastic resin (an amorphous polyamide copolymer based on bis(para-aminocyclohexl) methane) was placed on the frame before winding the sliver and another was added after winding was complete. The entire sandwich was vacuum bagged at 280° C. for 20 minutes after which time it was cut from the frame. This product, called a pre-form was now a well-impregnated, relatively stiff matrix/stretch-broken sliver sandwich, in which all the slivers were aligned in one direction.

Seven of these preforms were stacked on top of one another with all the fibers in the same direction. This stack was heated in a mold at 305° C. at 600 pounds per square inch for 40 minutes to make a well-consolidated plate 58 mils thick and fiber volume fraction of 55%. One half inch strips cut from this plate were subjected to tensile tests at 8 inch gauge length with the following results:

| Tensile strength, psi | 246,000 |
|---|---|
| Modulus, psi | 18,800,000 |

The uniformity of orientation of the fibers on the surface of this plate were measured from a photomicrograph and it was found that 92% of the fibers were within ±5 degrees of the axial direction. The product of this example, although made of discontinuous staple fiber, was equivalent to the strength and modulus of continuous filament fiber (Example 15).

EXAMPLE 17

Continuous filament 6700 denier glass fiber was made into a warp, preforms and a unidirectional plate by the method of Example 1. The end count was 15.5 per inch, the film was 3.0 mil thick PET (poly(ethylene terephthalate)) and 5 preforms were stacked to make the plate which was 55% fiber volume fraction. The plate was cut into 0.5 inch strips, provided with aluminum tabs and subjected to tensile tests at 8 inch gauge length with the following results:

| Tensile strength, psi. | 156,000 |
|---|---|
| Modulus, psi. | 7,300,000 |

It was concluded that the product of Example 17 exhibited the strength and stiffness expected of continuous filament glass fiber.

EXAMPLE 18

A unidirectional plate was made from pre-laminate from Example 13 by stacking 5 layers in a mold with all slivers in the same direction and heating in a press as in the reference example to give a final thickness of 103 mils. One-half inch strips cut from this plate were subjected to tensile tests at 8 inch gauge length with the following results:

| Tensile Strength, psi | 86,800 |
|---|---|
| Modulus, psi | 5,900,000 |

It was concluded that strength and modulus of the product of this example, although not as high as those from continuous filament glass (Example 17) were far superior to those of randomly oriented glass composites of equivalent fiber volume fraction reported in the literature (ref. B. D. Agarwal, L. J. Broutman, "Analysis and Performance of Fiber Composites" p. 92) which are:

| Tensile Strength, psi | 23,000 |
|---|---|
| Modulus, psi | 2,400,000 |

We claim:

1. A cohesive sliver of stretch broken carbon fibers having a coating of finish thereon, said finish comprsing a viscous lubricant said silver having a cohesion of at least 0.01 grams/denier.

2. The silver of claim 2, wherein said finish comprises polyethylene glycol monolaurate and a laural amide.

3. A sliver of claims 1 or 2 wherein the percent finish on the sliver is from about 0.3 to about 0.5%.

* * * * *